United States Patent
Maimone et al.

(10) Patent No.: US 7,966,527 B2
(45) Date of Patent: Jun. 21, 2011

(54) WATCHDOG MECHANISM WITH FAULT RECOVERY

(75) Inventors: Giuseppe Maimone, Munich (DE); Rainer Troppmann, Kranzberg (DE)

(73) Assignee: Texas Instruments Incorporated, Dallas, TX (US)

( * ) Notice: Subject to any disclaimer, the term of this patent is extended or adjusted under 35 U.S.C. 154(b) by 315 days.

(21) Appl. No.: 12/181,133

(22) Filed: Jul. 28, 2008

(65) Prior Publication Data
US 2009/0044050 A1    Feb. 12, 2009

Related U.S. Application Data

(60) Provisional application No. 61/016,751, filed on Dec. 26, 2007, provisional application No. 61/016,752, filed on Dec. 26, 2007.

(30) Foreign Application Priority Data

Jul. 30, 2007    (DE) .................. 10 2007 035 586

(51) Int. Cl.
*G06F 11/00*    (2006.01)
(52) U.S. Cl. ............ 714/55; 714/51; 714/735; 714/736; 714/742; 709/201; 709/202; 709/203; 709/208; 709/209; 709/210; 709/211
(58) Field of Classification Search .............. 714/51, 714/55, 735, 736, 742; 709/201–203, 208–211
See application file for complete search history.

(56) References Cited

U.S. PATENT DOCUMENTS

| | | | |
|---|---|---|---|
| 4,291,403 A | 9/1981 | Waddill et al. | |
| 5,848,143 A * | 12/1998 | Andrews et al. | ......... 379/265.09 |
| 5,961,622 A | 10/1999 | Hudson et al. | |
| 6,061,810 A | 5/2000 | Potter | |
| 6,941,247 B2 * | 9/2005 | Voigt et al. | ................ 702/188 |
| 7,277,783 B2 * | 10/2007 | Predelli | ....................... 701/48 |

(Continued)

FOREIGN PATENT DOCUMENTS
WO    WO 85/02042    5/1985

OTHER PUBLICATIONS

Lyu, (Software Fault Tolerance in a clustered architecture: Techniques and Reliability Modeling), 1999, IEEE, 1-11.*

(Continued)

*Primary Examiner* — Robert Beausoliel
*Assistant Examiner* — Jeison C Arcos
(74) *Attorney, Agent, or Firm* — John J. Patti; Wade J. Brady, III; Frederick J. Telecky, Jr.

(57) ABSTRACT

A method for handling watchdog events of an electronic device includes detecting a watchdog fault in a normal mode, which is a watchdog event in which a watchdog trigger is not correctly serviced; entering from the normal mode into a first escalation level of nx escalation levels upon detection of the watchdog fault, wherein nx is an integer equal to or greater than 1; detecting correct watchdog events, which are watchdog events in which a watchdog trigger is correctly serviced; and concurrently detecting watchdog faults, leaving the first escalation level if a first escalation condition is met, and recovering in a recovering step back from any of the nx escalation levels to a previous level or mode, if a de-escalation condition is met. An electronic device embodiment includes a CPU and program instructions for carrying out the method.

18 Claims, 2 Drawing Sheets

U.S. PATENT DOCUMENTS

| | | | |
|---|---|---|---|
| 2001/0016789 A1* | 8/2001 | Staiger | 701/1 |
| 2003/0028680 A1 | 2/2003 | Jin | |
| 2003/0105537 A1* | 6/2003 | Crispin et al. | 700/20 |
| 2004/0153747 A1* | 8/2004 | Czajkowski | 714/10 |
| 2004/0225381 A1* | 11/2004 | Ritz et al. | 700/26 |
| 2009/0172036 A1* | 7/2009 | Marx | 707/104.1 |

OTHER PUBLICATIONS

"Watchdog Timers," EE Times-India, Nov. 2000, pp. 1-5 (Nial Murphy).

* cited by examiner

WATCHDOG MECHANISM WITH FAULT RECOVERY

This patent application claims priority from German Patent Application No. 10 2007 035 586.8 filed 30 Jul. 2007, and U.S. Provisional Patent Application No. 61/016,751 filed 26 Dec. 2007, the entireties of which are incorporated herein by reference.

FIELD OF THE INVENTION

The invention relates to a method for handling watchdog events in an electronic device. The invention also relates to an electronic device adapted to handle watchdog events.

BACKGROUND

Watchdog mechanisms are used in electronic devices, like watchdog devices, microcontrollers, digital signal processors (DSPs) and other devices having a CPU and executing programs. These electronic devices are usually part of an electronic system, e.g., acting as a system supervisor. A watchdog mechanism is typically based on a counter that is clocked by the system clock or a clock which is derived from the system clock. The counter issues a watchdog fault every time a predefined counter state is reached. The watchdog fault state entails a system reset in order to bring the system back into a well-defined initial state in case the counter is not serviced by a watchdog trigger before the predefined counter state is reached, such as because the program issuing the watchdog trigger hangs or malfunctions. However, the system reset may not be the appropriate means to overcome the problems of the CPU. In case the CPU has severe technical problems, a mere reset may cause a loss of internal data. Also, during the time needed for the reset, the CPU is not available for further data processing, which might be a waste of CPU processing time, if only a minor and temporary problem exists.

SUMMARY

It is an object of the invention to provide a method and an electronic device to handle watchdog faults and system resets in a more flexible way in order to avoid loss of data and time.

In one aspect, the invention provides a method for handling watchdog events of an electronic device. In a normal operation mode of an embodiment, a watchdog fault is detected, which is a watchdog event in which a watchdog trigger is not correctly serviced. Upon detection of the watchdog fault, the electronic device enters into a first escalation level from the normal mode. The escalation level can be one of nx escalation levels, wherein nx is an integer equal to or greater than 1. In this first escalation level, correct watchdog events, which are watchdog events in which a watchdog trigger is correctly serviced, and watchdog faults are detected. The electronic device remains in the first escalation level until a specific first escalation condition or a first de-escalation condition is met. Both conditions can be based on the detected correct watchdog events and the detected watchdog faults. In particular, the electronic device can recover in a recovering step back from any of the nx escalation levels to any previous level or mode, if a specific de-escalation condition is met. So, the invention provides at least one escalation level, in which a further escalation condition is monitored before the electronic device proceeds to another level. Further, a de-escalation or recovery mechanism is provided that allows the electronic device to step back to a previous escalation level or to the normal mode. This allows the watchdog faults and system resets to be handled in a more flexible way. In particular, the electronic device may continue program execution in this first escalation state until the second escalation condition is met. If a specific de-escalation condition is met, the electronic device can even return to normal mode or a lower escalation level. This aspect provides that after a certain time of normal operation, the system can re-establish an entirely normal functionality. In the context of the invention, the program can be any kind of sequence of operations implemented with software, hardware, finite state machines, microcode, nanocode, logic gates, etc.

For example, the de-escalation condition can be defined such that n consecutive correct watchdog events are detected before another watchdog fault is detected, wherein n is greater than 1. The number and sequence of correct watchdog events is a reliable indicator that normal functionality of the electronic device is resumed.

The first escalation condition can be met if the number of counted watchdog faults exceeds a maximum number of watchdog faults, or if a correct watchdog event is not detected before expiration of a first recovery time after detection of the last watchdog fault. So, there can be time limit in the form of a recovery time, during which at least one correct watchdog event must be detected. Further, every time a watchdog fault occurs, the corresponding count of watchdog faults can be increased.

Further escalation levels can be provided, up to a theoretically unlimited number. The second escalation level can have substantially the same or different properties with respect to the first escalation level. In this situation, the electronic device can enter into a second escalation level after leaving the first escalation level and remain in the second escalation level until a second escalation condition is met. However, the electronic device can recover in a recovering step back from any escalation level, i.e., any of the nx escalation levels, to any previous level or mode, for example to the first escalation level or to the normal mode, if a second de-escalation condition is met. In the second escalation level, the watchdog faults can be detected and counted and correct watchdog events can be detected concurrently. For example, the second de-escalation condition can be implemented to be defined such that m consecutive correct watchdog events are detected before another watchdog fault is detected, wherein m is greater than 1.

The second escalation condition can be predetermined such that a maximum number of watchdog faults is reached or a correct watchdog event is not detected before a second recovery time has expired after detection of the last watchdog fault. The length of the second and the first recovery times can be the same or different. Advantageously, a reset signal can be activated in the second escalation level. The reset signal can be used to reset specific parts or stages of the system (e.g., the CPU) or a limited number of functional blocks of an electronic device. The watchdog will preferably not be reset in the second escalation level. Generally, there might be a indefinite number of escalation levels similar to the first escalation level before the electronic device finally enters into an escalation level of the type of the second escalation level, in which a reset signal is issued. In a second escalation level, the reset signal can preferably be deactivated when a finite reset time has expired. Also, the reset signal can be activated for the finite reset time each time a watchdog fault is detected. Accordingly, the reset signal is only asserted for a time sufficiently long in order to correctly reset the system. However, after having reset the system, the electronic device remains in the second escalation level and continues operation until a second escalation condition is met.

After leaving any escalation level, or numerous escalation levels of a first type or a second type following the first type, the electronic device and therefore the system can enter into a final safe state. The final safe state is a state where the system to which the electronic device belongs is secured by measures that are specific for the application. For example, the electronic device can be microcontroller in a car used for controlling the brakes. If the microcontroller malfunctions, i.e., watchdog faults occur, the microcontroller may then pass from normal mode to a first escalation level and from there to a second escalation level. If the device still malfunctions after being reset in the second escalation level, the device enters into a safe state, where the basic functionality of the brakes is somehow maintained. After having performed the necessary steps to ensure that the brakes continue to work, the microcontroller can then, for example, switch off. Other applications may require that a specific data is copied from volatile memory to non-volatile memory, when the safe state is reached. After expiration of the reset time further watchdog faults are detected and counted. Concurrently to the detection and counting of the watchdog faults, correct watchdog events are detected. Each time a watchdog fault is detected, another reset pulse is issued, i.e., the reset signal is activated for the finite reset time. Finally, when a maximum number of watchdog faults is reached or a correct watchdog event is not detected before a second recovery time has expired after detection of the last watchdog fault, the electronic device, and hence the system, enters into a final safe state. In this state, the reset signal can, for example, remain activated. Also, in the safe state important data may be permanently stored or moved from a volatile memory to non-volatile memories. Emergency functions may be installed in the processor in order to perform the necessary data rescuing steps in the safe state.

According to the invention, watchdog events are handled in a more flexible way. If a processor, which uses the invention, produces a watchdog fault, the processor can remain in the first escalation level. A reset pulse is not issued. Further, normal operation of the processor can continue and important processing time is preserved. The possibility of recovering or de-escalating from any escalation level, either in a stepwise manner or directly to normal mode gives an additional degree of reliability and system stability.

In another aspect, the invention also relates to an electronic device, in particular to a microcontroller or a processor having an integrated CPU, which is adapted to handle watchdog events. In an embodiment, the electronic device is adapted to detect a watchdog fault in a normal operating mode, which is a watchdog event in which a watchdog trigger is not correctly serviced. Further, the electronic device is adapted to enter from the normal mode into a first escalation level upon detection of the watchdog fault, which can be one of nx escalation levels, wherein nx is an integer equal to or greater than 1. The electronic device can then (i.e., in the first escalation level) detect correct watchdog events, which are watchdog events in which a watchdog trigger is correctly serviced, and concurrently detect watchdog faults. The electronic device embodiment is adapted to leave the first escalation level if a first escalation condition is met, which is based on the detected correct watchdog events and the detected watchdog faults. Accordingly, the electronic device is adapted in accordance with some or all of the aspects explained hereinabove.

Each of the escalation levels and also the safe state mode may include several states. For example, the first escalation level may include a first state and a second state dependent on the last detected watchdog event. Also, the second escalation level may include two states: a first state, if the last detected event was a watchdog fault; and a second state, if the last event was a correct watchdog event. The electronic device may then toggle between the two states until the escalation condition is reached. In the second escalation level, one of the states can include issuing of the reset pulse, whereas the other state does not trigger a reset signal. Also, a recovery step to a lower escalation level can advantageously only start from a specific state within a level. This might preferably be a state, in which a correct watchdog event has previously been detected at least once.

BRIEF DESCRIPTION OF THE DRAWINGS

Other aspects of the invention will be apparent from the further description of example embodiments below, considered with reference to accompanying drawings, wherein.

DETAILED DESCRIPTION OF EXAMPLE EMBODIMENTS

Figure 1:
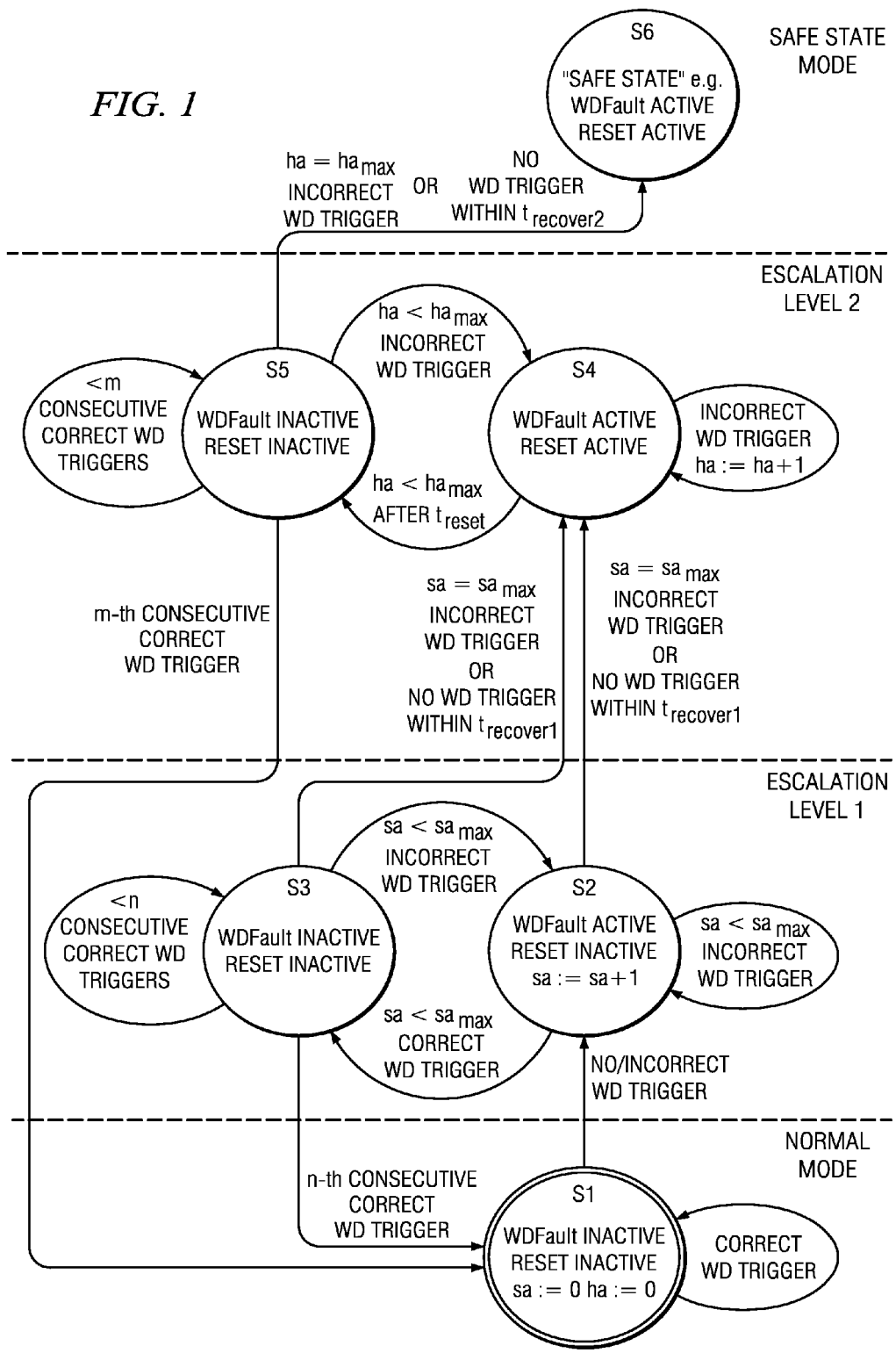
FIG. 1 shows a simplified state diagram illustrating the steps according to the invention.

FIG. 1 shows the different levels or states of an example electronic device implemented in accordance with the invention. The watchdog fault and the system reset are typically issued as a signal, but may also be available as a flag indicating the signal value. In a normal mode, the electronic device remains in state S1 as long as it sees correct watchdog triggers (i.e., correct WD triggers), and the signals and the related flags WDFault and Reset are inactive. The parameters sa and ha are initialized and set to zero. If a watchdog fault (i.e., an incorrect WD trigger) is detected, the electronic device enters into state S2 in escalation level 1. In escalation level 1, the parameter sa is increased by one every time a watchdog fault (incorrect WD trigger) is detected. In state S2, the WDFault signal and the related flag remains active, and the reset signal Reset and the related flag remains inactive. If a correct WD trigger is detected, the processor passes to state S3, where the WDFault signal and the related flag are set inactive. The electronic device remains in state S3 as long as correct WD triggers are detected. However, if either the maximum number $sa_{max}$ of incorrect WD triggers is reached (i.e., if $sa=sa_{max}$), or no correct WD trigger is detected within a first recovery time window $t_{recover1}$, the electronic device proceeds to state S4 in the second escalation level (escalation level 2). Also in state S4, the WDFault signal and the related flag are set active as long as no correct WD triggers are detected. Each time an incorrect WD trigger is detected, the parameter ha is increased by one. If a correct WD trigger occurs, the processor moves on to state S5, and the WDFault signal and the related flag are set inactive. Further, the reset signal Reset and the related flag become inactive. However, when entering into state S4 in escalation level 2, at least one reset pulse is produced by setting Reset in an active state. Thereafter, and only as long as correct WD triggers are detected, the electronic device remains in state S5 without further reset pulses as long as the number of consecutive correct WD triggers is less then m. Once the m-th consecutive correct WD trigger is reached, the electronic device returns to state S1. If no correct WD trigger is detected within a second recovery time window $t_{recover2}$ or the maximum number $ha_{max}$ of incorrect WD triggers is reached (i.e., $ha=ha_{max}$), the electronic device enters into a safe state S6. In the safe state, for example, WDFault and Reset both remain active and special data protecting or saving measures may be performed.

Further, from state S3 in escalation level 1 and from state S5 in escalation level 2, the electronic device can fall back to state S1 in normal mode. The condition for this recovery or de-escalation step is that a sequence of either n or m consecutive correct WD triggers has been detected. In an alternative embodiment, a recovery step could be provided that leads from state S5 to S3. Each escalation level can thus be left in two ways, either to a higher escalation level or to lower (i.e., previous) escalation. Escalation level 1 would then be the previous escalation level with respect to escalation level 2. For a sequence of nx escalation levels, a recovery step could be implemented leading back to any escalation level lower than nx (i.e., any previous escalation level) and also to normal mode.

Figure 2A:
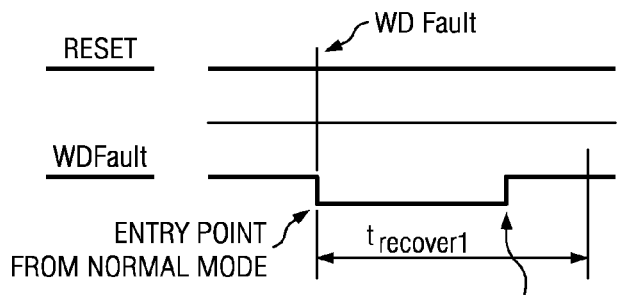
FIGS. 2A-2C show signals relating to the first escalation level according to the invention.
Figure 2C:
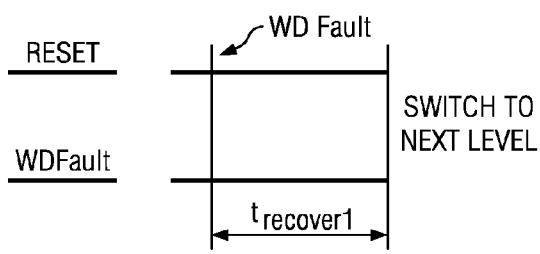
Figure 2B:
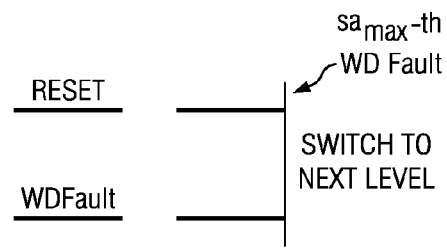

FIGS. 2A-2C shows signals relating to the first escalation level, escalation level 1. FIG. 2A illustrates a situation, where $sa<sa_{max}$ and n correct WD triggers are received within the first recovery time $t_{recover1}$. Accordingly, the reset signal Reset remains inactive and the watchdog fault signal WDFault toggles from high to low when a first watchdog fault WDFault occurs. However, within the recovery time $t_{recover1}$ n correct watchdog event WD triggers occur and the watchdog fault signal WDFault is set inactive, i.e., logic high again. However, in addition to setting WDFault inactive, the system will move in a recovery step to state S1, i.e., back to normal mode. Further, the situation shown in FIGS. 2B and 2C relate to a situation wherein $sa=sa_{max}$ but no correct WD trigger is detected within the first recovery time $t_{recover1}$. Accordingly, as soon as the last watchdog fault WDFault occurs, the electronic device switches to the next level, which will be state S4 in escalation level 2. Also, as shown in FIG. 2C, if the first recovery time $t_{recover1}$ expires before a correct watchdog trigger is received, the electronic device will switch to the next level, which is the second escalation level.

Figure 3A:
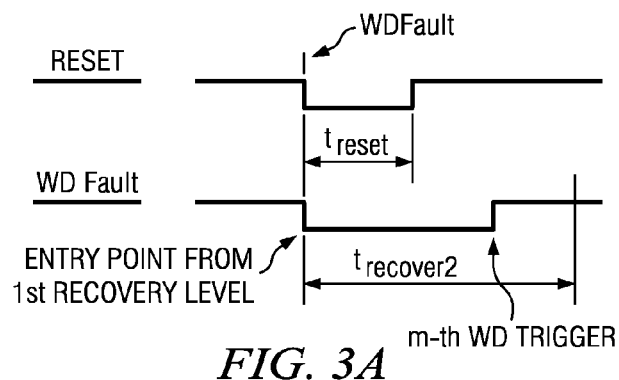
FIGS. 3A-3C show signals relating to the second escalation level according to the invention.
Figure 3C:
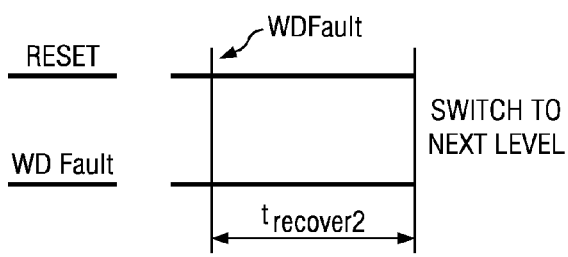
Figure 3B:
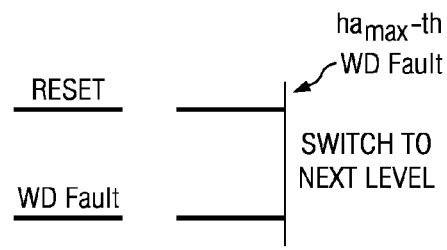

FIGS. 3A-3C show signals relating to the second escalation level. In the second escalation level, a reset pulse is issued in order to reset the electronic device. The situation for $ha<ha_{max}$ is shown in FIG. 3A. If m correct watchdog events are detected (indicated by m-th WD trigger in FIG. 3A) WDFault is set inactive, i.e., WDFault is set to logic high. This will also de-escalate the system and the system will continue in lower level, i.e., in normal mode. A recovery step to escalation level 1, i.e., to any previous escalation is also conceivable. The FIGS. 3B and 3C relate to a situation where $ha=ha_{max}$ or no correct WD trigger is detected within the second recovery time $t_{recover2}$. Accordingly, when the next watchdog fault WDFault is detected, the system switches to the next level, which is the safe state S6. Also, if the second recovery time $t_{recover2}$ expires without a correct watchdog event, the system switches to the safe state S6. FIG. 3A relates to a situation where $ha<ha_{max}$ and a correct WD trigger is detected within the second recovery time $t_{recover2}$.

An electronic device, such as any integrated electronic device with a CPU, can be adapted to perform the described method steps. Further, the number of escalation levels is not limited to one first escalation level without reset and a second escalation level with a reset function. The number and sequence of escalation levels of the first type or the second type can be an integer equal to or greater than 1. Also, the sequence of escalation levels with and without reset can be any sequence of first and second escalation levels. The safe state can also be reached directly after the first escalation level, if a second escalation level with reset is not required. The recovery or de-escalation steps are not limited. Any higher escalation level can have a recovery mechanism so as to recover to any lower or previous escalation level.

Those skilled in the art will appreciate that other embodiments and variations are possible within the scope of the claimed invention; and that embodiments having different combinations of one or more of the features or steps described in the context of the described embodiments are also intended to be covered hereby.

What is claimed is:

1. A method comprising:
    detecting an incorrect watchdog trigger in a normal mode;
    entering from the normal mode into a first state of a first escalation level of a plurality of escalation levels upon detection of the watchdog fault;
    entering from the first state of the first escalation level to a second state of the first escalation level if a correct watchdog trigger is detected;
    returning to the first state of the first escalation level from the second state of the first escalation level if the incorrect watchdog trigger is detected;
    entering from the first escalation level into a second escalation level of the plurality of escalation levels if:
        a number of detections of the watchdog fault while at the first escalation level exceeds a predetermined maximum; or
        the watchdog fault is not corrected within a predetermined period; and
    returning from the second state of the first escalation level to the normal mode if consecutive detections of the correct watchdog trigger exceeds a predetermined threshold.

2. The method of claim 1, wherein the step of entering from the first escalation level into a second escalation level further comprises entering into a first state of the second escalation level.

3. The method of claim 2, wherein the method further comprises entering from the first state of the second escalation level to a second state of the second escalation level if a correct watchdog trigger is detected.

4. The method of claim 3, wherein the method further comprises returning to the first state of the second escalation level to the second state of the second escalation level if the incorrect watchdog trigger is detected.

5. The method of claim 4, wherein the predetermined maximum and the predetermined period further comprise a first predetermined maximum and a first predetermined period, respectively, and wherein the method further comprises entering from the second escalation level into a safe mode if:
    a number of detections of the watchdog fault while at the second escalation level exceeds a second predetermined maximum; or
    the watchdog fault is not corrected within a second predetermined period.

6. The method of claim 5, wherein the step of entering from the normal mode into the first state of the first escalation level of the plurality of escalation levels upon detection of the watchdog fault further comprises setting a first parameter and a second parameter to zero.

7. The method of claim 6, wherein the method further comprises iterating the first parameter each time the incorrect watchdog trigger is detected while at the first escalation level so as to generate the number of detections of the watchdog fault while at the first escalation.

8. The method of claim 7, wherein the method further comprises iterating the second parameter each time the incorrect watchdog trigger is detected while at the second escalation level so as to generate the number of detections of the watchdog fault while at the second escalation.

9. The method of claim 8, wherein the threshold further comprises a first threshold, and wherein the method comprises returning from the second state of the second escalation level to the normal mode if consecutive detections of the correct watchdog trigger exceeds a second predetermined threshold.

10. An apparatus having a processor and a non-transitory computer readable storage medium with computer instructions embodied thereon, the computer instructions performing the steps:
   detecting an incorrect watchdog trigger in a normal mode;
   entering from the normal mode into a first state of a first escalation level of a plurality of escalation levels upon detection of the watchdog fault;
   entering from the first state of the first escalation level to a second state of the first escalation level if a correct watchdog trigger is detected;
   returning to the first state of the first escalation level from the second state of the first escalation level if the incorrect watchdog trigger is detected;
   entering from the first escalation level into a second escalation level of the plurality of escalation levels if:
      a number of detections of the watchdog fault while at the first escalation level exceeds a predetermined maximum; or
      the watchdog fault is not corrected within a predetermined period; and
   returning from the second state of the first escalation level to the normal mode if consecutive detections of the correct watchdog trigger exceeds a predetermined threshold.

11. The computer instructions of claim 10, entering from the first escalation level into a second escalation level further comprises entering into a first state of the second escalation level.

12. The computer instructions of claim 11, wherein the computer instructions further comprises entering from the first state of the second escalation level to a second state of the second escalation level if a correct watchdog trigger is detected.

13. The computer instructions of claim 12, wherein the computer instructions further comprises returning to the first state of the second escalation level to the second state of the second escalation level if the incorrect watchdog trigger is detected.

14. The computer instructions of claim 13, wherein the predetermined maximum and the predetermined period further comprise a first predetermined maximum and a first predetermined period, respectively, and wherein the computer instructions further comprises entering from the second escalation level into a safe mode if:
   a number of detections of the watchdog fault while at the second escalation level exceeds a second predetermined maximum; or
   the watchdog fault is not corrected within a second predetermined period.

15. The computer instructions of claim 14, wherein entering from the normal mode into the first state of the first escalation level of the plurality of escalation levels upon detection of the watchdog fault further comprises setting a first parameter and a second parameter to zero.

16. The computer instructions of claim 15, wherein the computer instructions further comprises iterating the first parameter each time the incorrect watchdog trigger is detected while at the first escalation level so as to generate the number of detections of the watchdog fault while at the first escalation.

17. The computer instructions of claim 16, wherein the computer instructions further comprises iterating the second parameter each time the incorrect watchdog trigger is detected while at the second escalation level so as to generate the number of detections of the watchdog fault while at the second escalation.

18. The computer instructions of claim 17, wherein the threshold further comprises a first threshold, and wherein the computer instructions comprises returning from the second state of the second escalation level to the normal mode if consecutive detections of the correct watchdog trigger exceeds a second predetermined threshold.

* * * * *